US012615322B2

(12) United States Patent
Biederman et al.

(10) Patent No.: US 12,615,322 B2
(45) Date of Patent: Apr. 28, 2026

(54) MULTIPLE TIME DOMAIN NETWORK DEVICE TRANSLATION

(71) Applicant: Intel Corporation, Santa Clara, CA (US)

(72) Inventors: Daniel Christian Biederman, Saratoga, CA (US); Mark Bordogna, Andover, MA (US); Srinivasan S. Iyengar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 17/500,576

(22) Filed: Oct. 13, 2021

(65) Prior Publication Data

US 2022/0337683 A1 Oct. 20, 2022

Related U.S. Application Data

(60) Provisional application No. 63/174,782, filed on Apr. 14, 2021.

(51) Int. Cl.
*H04L 69/28* (2022.01)
(52) U.S. Cl.
CPC .................................. *H04L 69/28* (2013.01)
(58) Field of Classification Search
CPC ...... H04L 7/0008; H04L 69/28; H04J 3/0638; H04J 3/0667; H04J 3/0685; H04J 3/0673
See application file for complete search history.

(56) References Cited

U.S. PATENT DOCUMENTS 5,535,193 A 7/1996 Zhang et al.
5,579,513 A 11/1996 Strohmer
(Continued)

FOREIGN PATENT DOCUMENTS

KR 1020200073983 A 6/2020

OTHER PUBLICATIONS

M. N. Horak, S. M. Nowick, M. Carlberg and U. Vishkin, "A Low-Overhead Asynchronous Interconnection Network for GALS Chip Multiprocessors," in IEEE Transactions on Computer-Aided Design of Integrated Circuits and Systems, vol. 30, No. 4, pp. 494-507, Apr. 2011, doi: 10.1109/TCAD.2011.2114970. (Year: 2011).*
(Continued)

*Primary Examiner* — Messeret F Gebre
(74) *Attorney, Agent, or Firm* — Compass IP Law PC

(57) ABSTRACT
Examples described herein relate to a network interface device that includes circuitry to determine a target time domain in which to translate a time stamp associated with a workload and identify the target time domain to cause translation of the time stamp associated with the workload to the target time domain. In some examples, the network interface device stores time domain translation parameters of time stamps from a first time domain to one or more time domains and the network interface device translates the time stamp from the first time domain to the one or more time domains. In some examples, the network interface device comprises circuitry to store time domain translation parameters of time stamps from a first time domain to one or more time domains and the server is to perform translation of the time stamp from the first time domain to the one or more time domains based on the time domain translation parameters.

20 Claims, 14 Drawing Sheets

(56) References Cited

U.S. PATENT DOCUMENTS

| | | | |
|---|---|---|---|
| 6,556,832 B1 | 4/2003 | Soliman | |
| 7,103,072 B1* | 9/2006 | Sloan | H04J 3/0685 |
| | | | 370/503 |
| 7,590,151 B2 | 9/2009 | Middleton et al. | |
| 7,903,694 B2 | 3/2011 | Defrance et al. | |
| 9,003,220 B2 | 4/2015 | Chandhoke et al. | |
| 9,058,135 B1 | 6/2015 | Schumacher et al. | |
| 11,693,448 B2 | 7/2023 | Bordogna et al. | |
| 2001/0055311 A1 | 12/2001 | Trachewsky et al. | |
| 2002/0039370 A1 | 4/2002 | Elliot | |
| 2003/0117899 A1 | 6/2003 | Eidson | |
| 2003/0177154 A1 | 9/2003 | Vrancic | |
| 2004/0049706 A1 | 3/2004 | Strong | |
| 2004/0062278 A1 | 4/2004 | Hadzic et al. | |
| 2005/0228902 A1 | 10/2005 | Lienhart et al. | |
| 2007/0038999 A1 | 2/2007 | Millington | |
| 2007/0266119 A1 | 11/2007 | Ohly | |
| 2008/0270800 A1 | 10/2008 | Krober et al. | |
| 2010/0103781 A1 | 4/2010 | Rai et al. | |
| 2010/0118895 A1 | 5/2010 | Radulescu | |
| 2010/0158183 A1 | 6/2010 | Hadzic et al. | |
| 2010/0177763 A1 | 7/2010 | Stok et al. | |
| 2011/0276994 A1 | 11/2011 | Higgins et al. | |
| 2012/0030495 A1 | 2/2012 | Chandhoke et al. | |
| 2013/0125118 A1 | 5/2013 | Niesser et al. | |
| 2013/0301635 A1 | 11/2013 | Hollabaugh et al. | |
| 2013/0318390 A1 | 11/2013 | Takehara | |
| 2014/0098684 A1* | 4/2014 | Diab | H04L 43/087 |
| | | | 370/252 |
| 2014/0143582 A1 | 5/2014 | Kindred et al. | |
| 2014/0313289 A1 | 10/2014 | Kim et al. | |
| 2014/0355628 A1 | 12/2014 | Akhlaq et al. | |
| 2015/0163049 A1 | 6/2015 | Nors | |
| 2015/0277989 A1 | 10/2015 | Laborde et al. | |
| 2016/0014373 A1* | 1/2016 | LaFata | H04M 9/082 |
| | | | 348/14.08 |
| 2016/0062936 A1 | 3/2016 | Brassac et al. | |
| 2016/0072883 A1 | 3/2016 | Long et al. | |
| 2016/0112182 A1* | 4/2016 | Karnes | G06F 1/14 |
| | | | 375/362 |
| 2016/0170439 A1 | 6/2016 | Aweya | |
| 2016/0170440 A1 | 6/2016 | Aweya | |
| 2016/0231770 A1 | 8/2016 | Mallada et al. | |
| 2017/0237512 A1 | 8/2017 | Galea et al. | |
| 2017/0286359 A1* | 10/2017 | McGowan | G06F 13/4291 |
| 2017/0315582 A1 | 11/2017 | Zhang et al. | |
| 2017/0330278 A1 | 11/2017 | Radulescu | |
| 2018/0227080 A1 | 8/2018 | Stein et al. | |
| 2019/0045475 A1 | 2/2019 | Kasichainula | |
| 2019/0140815 A1* | 5/2019 | Faist | G05B 19/042 |
| 2019/0208381 A1 | 7/2019 | Booij et al. | |
| 2019/0332137 A1 | 10/2019 | Benjamini et al. | |
| 2020/0033906 A1 | 1/2020 | Maddukuri et al. | |
| 2020/0133330 A1 | 4/2020 | Bordogna et al. | |

OTHER PUBLICATIONS

H. Li, G. Shou, Y. Hu and Y. Liu, "SDN/NFV Enhanced Time Synchronization in Packet Networks," in IEEE Systems Journal, vol. 15, No. 4, pp. 5634-5645, Dec. 2021. (Year: 2021).*

International Search Report and Written Opinion for PCT Patent Application No. PCT/US22/20813, Mailed Jun. 24, 2022, 14 pages.

Sebastian Stieber et al., 'Accurate Sample Time Reconstruction of Inertial FIFO Data', MDPI, sensor, Dec. 13, 2017, doi:10.3390/s17122894.

Final Office Action for U.S. Appl. No. 16/726,684, Mailed Sep. 9, 2022, 13 pages.

First Office Action for U.S. Appl. No. 16/726,684, Mailed Mar. 18, 2022, 11 pages.

Garner, Geoffrey M., "IEEE 1588 Version 2", ISPCS Ann Arbor '08, Sep. 24, 2008, 89 pages.

Intel, "Intel 64 and IA-32 Architectures Software Developer's Manual, Combined vols. 1, 2A, 2B, 2C, 2D, 3A, 3B, 3C, 3D and 4, Section 17.17 Time-Stamp Counter", vol. 3B-17-41, May 2020, pp. 3431-3433, 3 pages.

Solomon, Richard, "Express Yourself—Spring Ahead", SYNOPSYS, https://blogs.synopsys.com/expressyourself/2014/03/09/spring-ahead/, posted Mar. 9, 2014, 4 pages.

First Office Action for U.S. Appl. No. 18/198,150, Mailed Jun. 12, 2024, 8 pages.

* cited by examiner

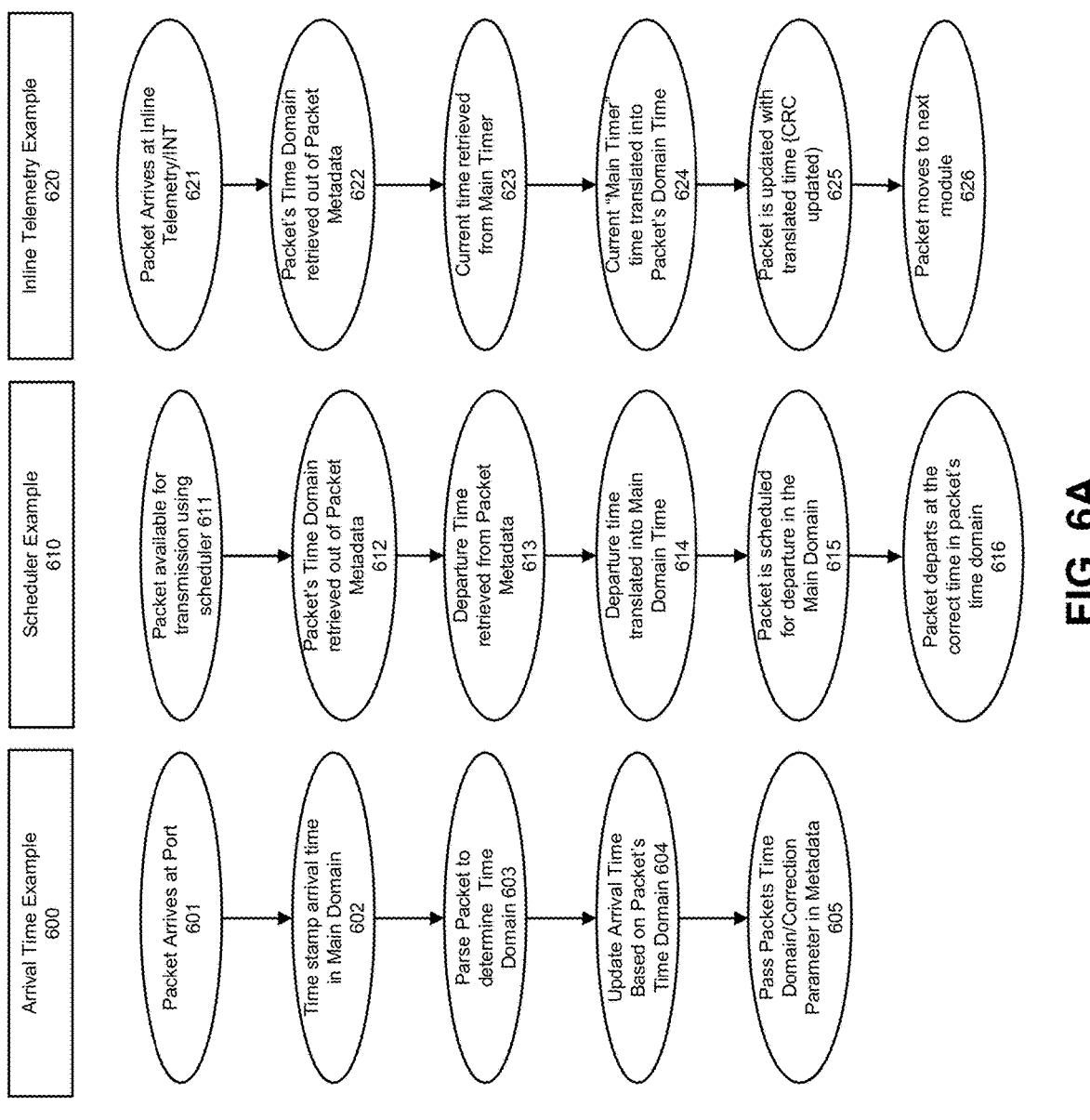

Inline Telemetry Example 620

Packet Arrives at Inline Telemetry/INT 621

Packet's Time Domain retrieved out of Packet Metadata 622

Current time retrieved from Main Timer 623

Current "Main Timer" time translated into Packet's Domain Time 624

Packet is updated with translated time {CRC updated) 625

Packet moves to next module 626

Scheduler Example 610

Packet available for transmission using scheduler 611

Packet's Time Domain retrieved out of Packet Metadata 612

Departure Time retrieved from Packet Metadata 613

Departure time translated into Main Domain Time 614

Packet is scheduled for departure in the Main Domain 615

Packet departs at the correct time in packet's time domain 616

Arrival Time Example 600

Packet Arrives at Port 601

Time stamp arrival time in Main Domain 602

Parse Packet to determine Time Domain 603

Update Arrival Time Based on Packet's Time Domain 604

Pass Packets Time Domain/Correction Parameter in Metadata 605

FIG. 6A

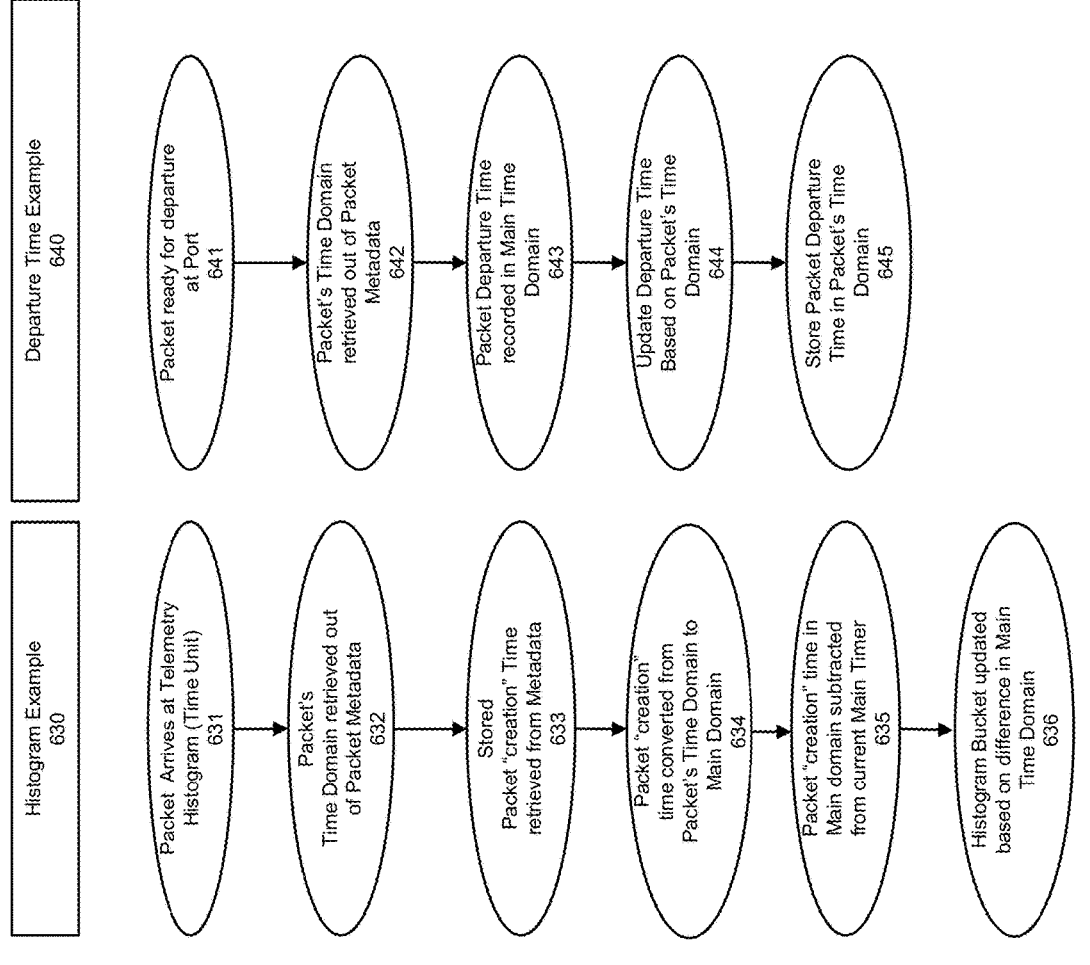

Departure Time Example 640

- Packet ready for departure at Port 641
- Packet's Time Domain retrieved out of Packet Metadata 642
- Packet Departure Time recorded in Main Time Domain 643
- Update Departure Time Based on Packet's Time Domain 644
- Store Packet Departure Time in Packet's Time Domain 645

Histogram Example 630

- Packet Arrives at Telemetry Histogram (Time Unit) 631
- Packet's Time Domain retrieved out of Packet Metadata 632
- Stored Packet "creation" Time retrieved from Metadata 633
- Packet "creation" time converted from Packet's Time Domain to Main Domain 634
- Packet "creation" time in Main domain subtracted from current Main Timer 635
- Histogram Bucket updated based on difference in Main Time Domain 636

FIG. 6B

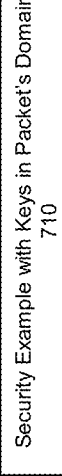

Security Example with Keys in Packet's Domain
710

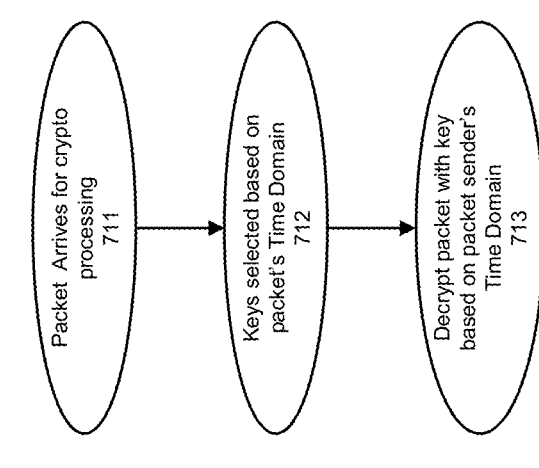

Packet Arrives for crypto processing
711

Keys selected based on packet's Time Domain
712

Decrypt packet with key based on packet sender's Time Domain
713

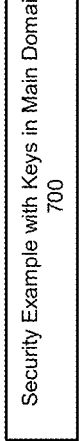

Security Example with Keys in Main Domain
700

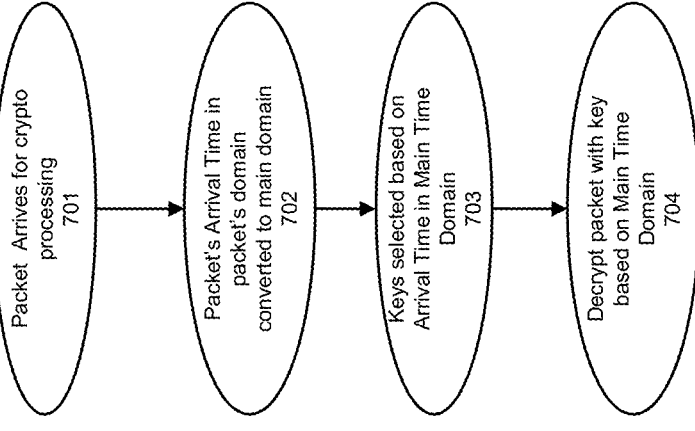

Packet Arrives for crypto processing
701

Packet's Arrival Time in packet's domain converted to main domain
702

Keys selected based on Arrival Time in Main Time Domain
703

Decrypt packet with key based on Main Time Domain
704

FIG. 7

IDENTIFY TIME DOMAIN OF PACKET
1102

DETERMINE PARAMETERS TO TRANSLATE TIME STAMP OF PACKET FROM
FIRST TIME DOMAIN TO SECOND TIME DOMAIN
1104

TRANSLATE TIME DOMAIN OF PACKET FROM THE FIRST TIME DOMAIN TO THE
SECOND TIME DOMAIN
1106

1200

MULTIPLE TIME DOMAIN NETWORK DEVICE TRANSLATION

RELATED APPLICATION

The present application claims the benefit of a priority date of U.S. provisional patent application Ser. No. 63/174,782, filed Apr. 14, 2021, the entire disclosure of which is incorporated herein by reference.

BACKGROUND

In distributed computing systems, operations are performed according to different timers and dime domains. Time stamp synchronization is used to attempt to synchronize time stamps in different time domains. Some solutions provide a per host main timer counter whereby 64-bit copies of multiple main timers are routed to different modules that consume the main timer (e.g., time stamping, telemetry, scheduling, traffic shaping, security, etc.). This could result in passing many traces throughout a chip, or could result in complex technologies to reuse a same path to transfer timer data precisely without affecting precision. Also, one timer per domain could create an excessive number of high speed timers in the chip (e.g., 4, 8, 16, and so forth).

BRIEF DESCRIPTION OF THE DRAWINGS

FIGS. 6A and 6B depict an example of processing of packets.

FIG. 7 depicts example security-related processing of packets.

DETAILED DESCRIPTION

Figure 1A:
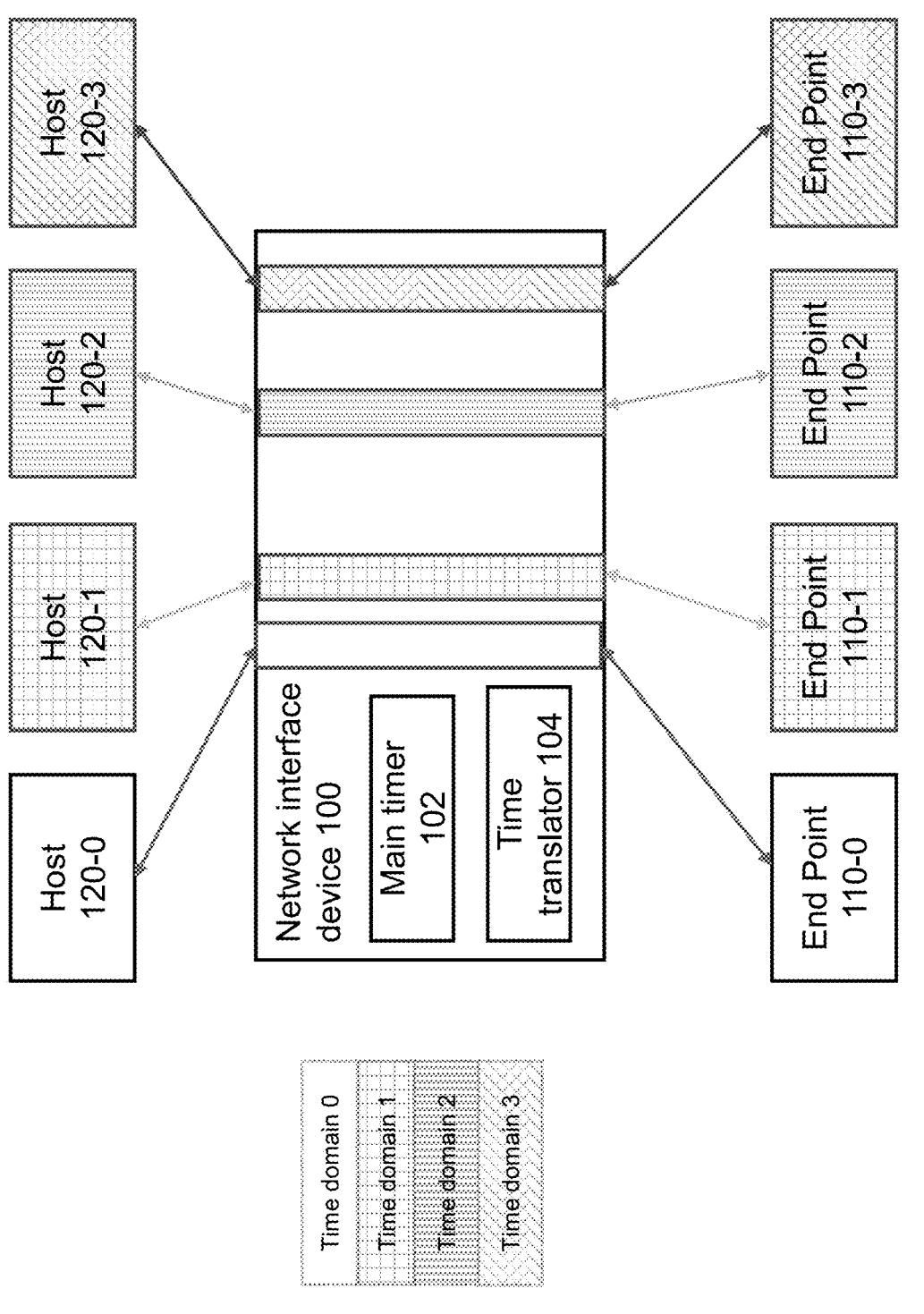
FIG. 1A shows an example of a network interface device providing translation to a time domain for multiple host devices.

The Institute of Electrical and Electronics Engineers (IEEE) 1588-2008 specification allows for multiple time domains whereby an entity (e.g., host, server, central processing unit (CPU), graphics processing unit (GPU), virtual machine, etc.) could utilize a time domain while another entity can utilize a different time domain. If the synchronization of time between the host is delegated to one of the available hosts, such as the primary host, then time-based features such as telemetry, timing wheel, Time-Sensitive Networking (TSN) or 802.1Qbv, network congestion and so forth could utilize primary host resources. Time synchronization across hosts by the primary host can be a challenge due to drift associated with time-based clocking across the various hosts. As drift can change over time, correction of drift may need to be adjusted over time.

Some examples offload management and time stamp generation for independent and potentially different time domains to the network interface device, so that host resources (e.g., server, central processing unit (CPU), graphics processing unit (GPU), cache, accelerator, Peripheral Component Interconnect Express (PCIe) connections, virtual machine, container, microservice, serverless application, and so forth) can operate in independent time domains. Some examples utilize a network interface device or other device connected by a device interface to a host to synchronize time domains of various hosts, host resources, or entities (e.g., virtual machines, containers, microservices, or serverless applications, packet flows, queues, and so forth) and a main timer domain of the network interface device or a network-based time domain. The main timer can be generated from a low jitter reference clock. In some examples, a network interface device can receive packets with indicators of one or more IEEE 1588 Precision Time Protocol (PTP) time domains and translate the specific PTP time domain from received packets to a time domain of a particular host or entity.

For example, the network interface device can perform time domain translation based on a table lookup with interpolation variables (e.g., linear, quadratic, or beyond) between a first timing domain and a second timing domain. For example, the first timing domain can be a timing domain of a network-based timer and the second timing domain can be a timing domain of a main timer of the network interface device. Other examples of timing domains are described herein. The network interface device can perform such translation for one or more hosts or entities.

For example, packet arrival time stamps can be translated to a particular target time domain. Some examples utilize a media access control (MAC) parser of a network interface device to identify an arriving packet's time domain (e.g., PTP time stamp) and generate a translated time stamp for one or more host and/or entity domains based on a lookup or calculation operation.

In some examples, translated time stamps can be used in connection with one or more of: in network telemetry or in-band telemetry (INT) (see, e.g., In-band Network Telemetry (INT) Dataplane Specification (2020) or other versions thereof available from The P4.org Applications Working Group), telemetry counter, PCIe precision time measurement (PTM), traffic shaping, scheduling, and timestamping packets.

In some examples, the network interface device can be implemented as one or more of: an infrastructure processing unit (IPU), data processing unit (DPU), smartNIC, forwarding element, router, switch, network interface controller, network-attached appliance (e.g., storage, memory, accelerator, processors, security), and so forth. In some examples, the network interface device can provide time units to distributed computing environments and a data center.

In some examples, the network interface device performs composing of hardware resources into composed nodes or composite nodes. For example, the network interface device can perform workload orchestration in accordance with Kubernetes, Management and Orchestration (MANO), Docker, and so forth. In some examples, the network interface device can control time domains with one or more composed nodes and scheduling of performance of work on various hardware resources (e.g., CPUs, GPUs, artificial intelligence (AI)/machine learning (ML) devices, Neural Convolution Engine (NCE), security processors, network processors, vector engines, visual processing units (VPUs), computer vision processor, digital signal processors (DSPs), accelerators, and so forth).

For example, an AI/ML/NN training or inference could start at times based on time domain translations from the network interface device. For example, a security engine could handle keys based on a time stamp translation made by the network interface device. The GPU could delay processing of certain data based on the time domain translation from the network interface device.

Telemetry units (e.g., internal to xPU paths or external across the xPU-to-xPU fabric), could calculate latency and other information based on the packet's time domain, determined by the network interface device. xPU schedulers could also be based on time stamp translation from their base time domain to a virtual machine's time domain.

FIG. 1A shows an example of a network interface device providing translation to a time domain for multiple host devices. In this configuration, network interface device 100 translates a time stamp based on main timer 102 or network-based timer into time domains for hosts 120-0 to 120-3. In this case, the main timer domain of main timer 102, described herein, can be used as a reference to determine time stamps for different domains for hosts 120-1 to 120-3.

In some examples, hosts 120-0 to 120-3 can be communicatively connected to network interface device 100 using a device interface (e.g., Peripheral Component Interconnect express (PCIe) or Compute Express Link (CXL)). In some examples, one or more of hosts 120-0 to 120-3 can include one or more: CPU, GPU, cache, accelerator, memory, storage, and/or persistent memory, as well as other components described with respect to FIG. 12. In some examples, hosts 120-0 to 120-3 can be communicatively connected to network interface device 100 as part of a system on chip (SoC) or integrated circuit.

In this example, no time stamp translation is performed for host 120-0 as it shares a same time domain with network interface device 100. In some examples, time translator 104 can determine a relationship between time stamps based on main timer 102 and time stamps of one or more of hosts 120-1 to 120-3. For example, one or more of hosts 120-0 to 120-3 can utilize at least one clock source to generate time stamps and time translator 104 can determine a relationship between time stamps of the at least one clock source and time stamps of main timer 102. For example, a time stamp counter (TSC), based on a crystal clock source (e.g., Always Running Timer (ART)) to hosts 120-0 to 120-3 is available as a reference clock source at one or more of hosts 120-0 to 120-3. For a description of the TSC within Intel® Architecture CPU cores, see volume 3, section 17.13.4 of Intel® 64 and IA-32 Architectures Software Developer's Manual (2019).

For example, the relationship determined can be a linear relationship:

$$y = m_N x + b_N, \text{ where}$$

y represents a time stamp of a time domain of a host 102-N (where N=1, 2, or 3), x represents a time stamp based on a main timer 102 and/or PTP network-based time stamp, $m_N$ represents a linear coefficient, and $b_N$ represents an offset.

Time translator 104 can re-determine the relationship periodically based on several data points in some examples. The relationship can be non-linear such as quadratic or other curves. A look up table (e.g., Time Domain Correction Table) can include coefficient $m_N$ and offset $b_N$ for time domains of hosts 102-1 to 102-3.

As described herein, network interface device 100 can convey time stamp translations to hosts 120-1 to 120-3 via meta data and/or received packet descriptors.

For example, as a packet for a host 120-1 arrives at network interface device 100, correction factors for host 120-1, namely, ml and bi, can be obtained by network interface device 100 from a table in memory. Reference time stamp, x, based on a main timer and/or PTP time stamps, can be adjusted to provide a time stamp of domain of host 120-1 using time translator 104. Host 120-1 can utilize an accelerator (e.g., traffic shaper) that schedules packet transmission based on the adjusted reference time, y, for processing a received data packet or data packet to be transmitted. Similar examples of time stamp translation can apply to hosts 120-2 and 120-3.

Figure 1B:
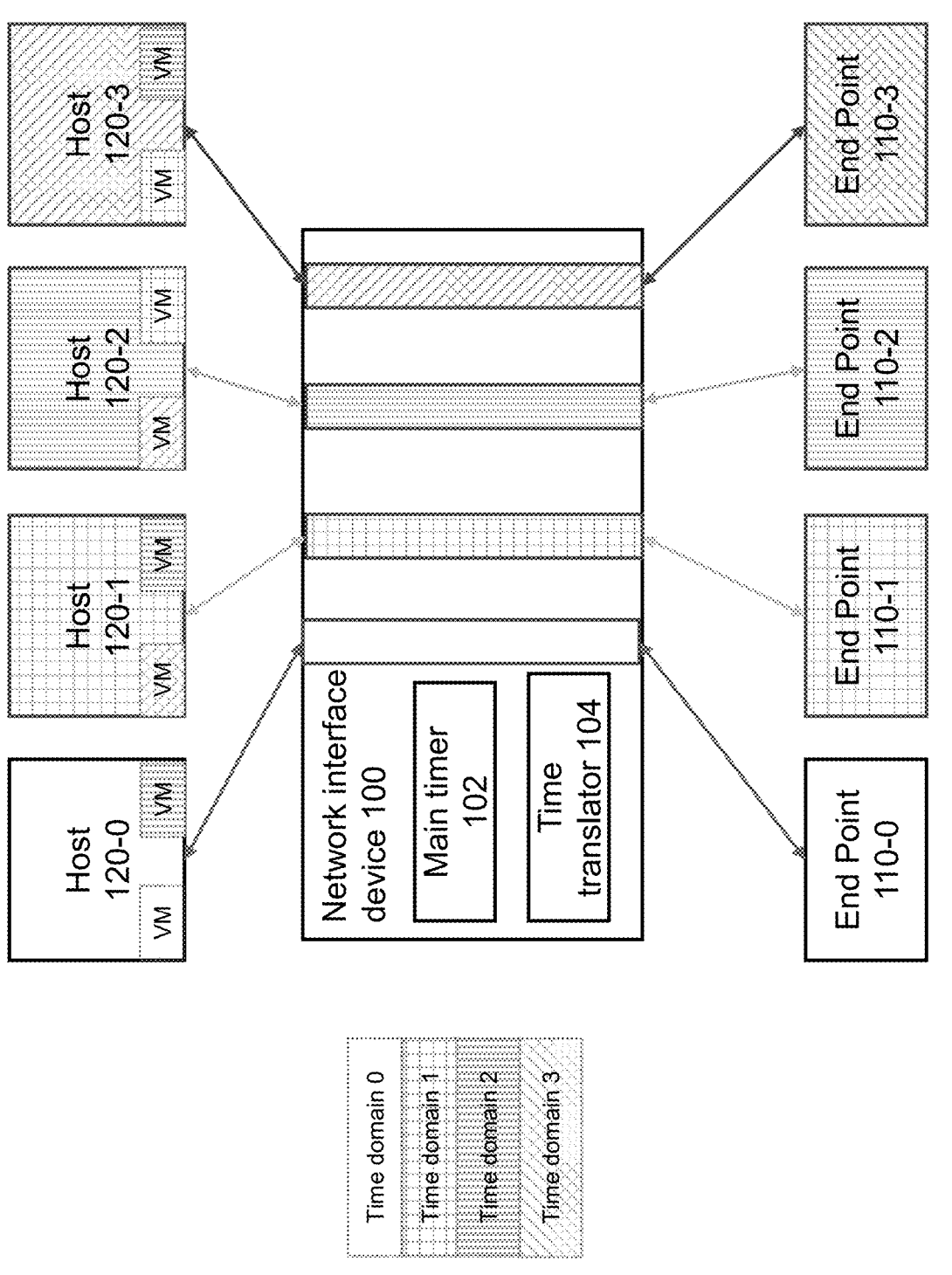
FIG. 1B shows an example system where a network interface device performs time stamp translation for virtual machines executing on hosts as well as hosts.

FIG. 1B shows an example system where a network interface device performs time stamp translation for virtual machines executing on hosts as well as hosts. This example provides for virtual machines (VMs) executing on hosts 120-0 to 120-3 and the VMs utilize different timing domains than hosts 120-0 to 120-3. For example, different fill patterns for VMs and hosts 120-1 to 120-3 can represent different time domains. Time translator 104 can determine translated time stamps based on relationships between time stamps of main timer 102 and/or PTP-based time stamps and a time domain of host 120-0 to 120-3 and/or VMs executed thereon. Time translator 104 can utilize a look-up to determine variables of a relationship between time stamps of main timer 102 and/or PTP-based time stamps and a time domain of host 120-0 to 120-3 and/or VMs executed thereon. Network interface device 100 can provide untranslated time stamps to host 120-0 and translated time stamps to hosts 120-1 to 120-3.

Note examples described relate to network interface device 100 performing translation of time stamps from a time domain to another time domain. However, in some examples, network interface device 100 can provide parameters used to translate time stamps to a host and the host can perform the time stamp translation. However, in some examples, network interface device 100 can provide parameters used to translate time stamps to a VM and the VM can perform the time stamp translation. While examples are described with respect to virtual machines, containers, microservices, threads, serverless applications, or processes could also receive translated time stamps from network interface device 100.

Figure 2:
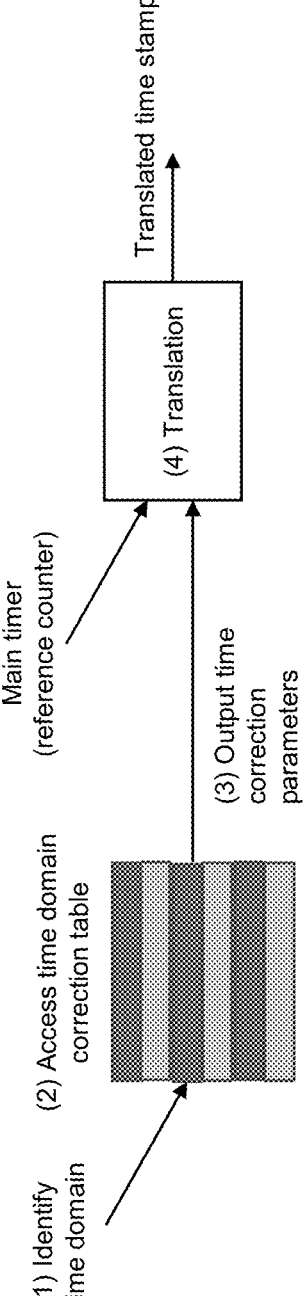
FIG. 2 shows an example of a process of translating a time stamp.

FIG. 2 shows an example of a process of translating a time stamp. At (1) a time domain could be determined from a received packet's n-tuple, metadata of the packet, parsing of the packet, port/host information, etc. For example, an n-tuple can include a source address, destination address, IP protocol, transport layer source port, and destination port. A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. In some examples, a flow can have its own time domain relative to main timer or other clock sources.

A packet may refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

At (2), based on time domain identified for a packet, a time domain correct table can be accessed to provide, at (3), an output of time correction parameters. At (4), a time stamp conversion of a main timer's time stamps could be performed based on correction parameters. For example, based on correction parameters of m and b, $y=mx+b$ can be used to determine a translated time stamp based on a main timer time stamp. The translated time stamp can reflect information concerning a packet such as packet arrival time, internal telemetry time, or other time values. Translation can occur at the network interface device or in a VM or host.

Figure 3:
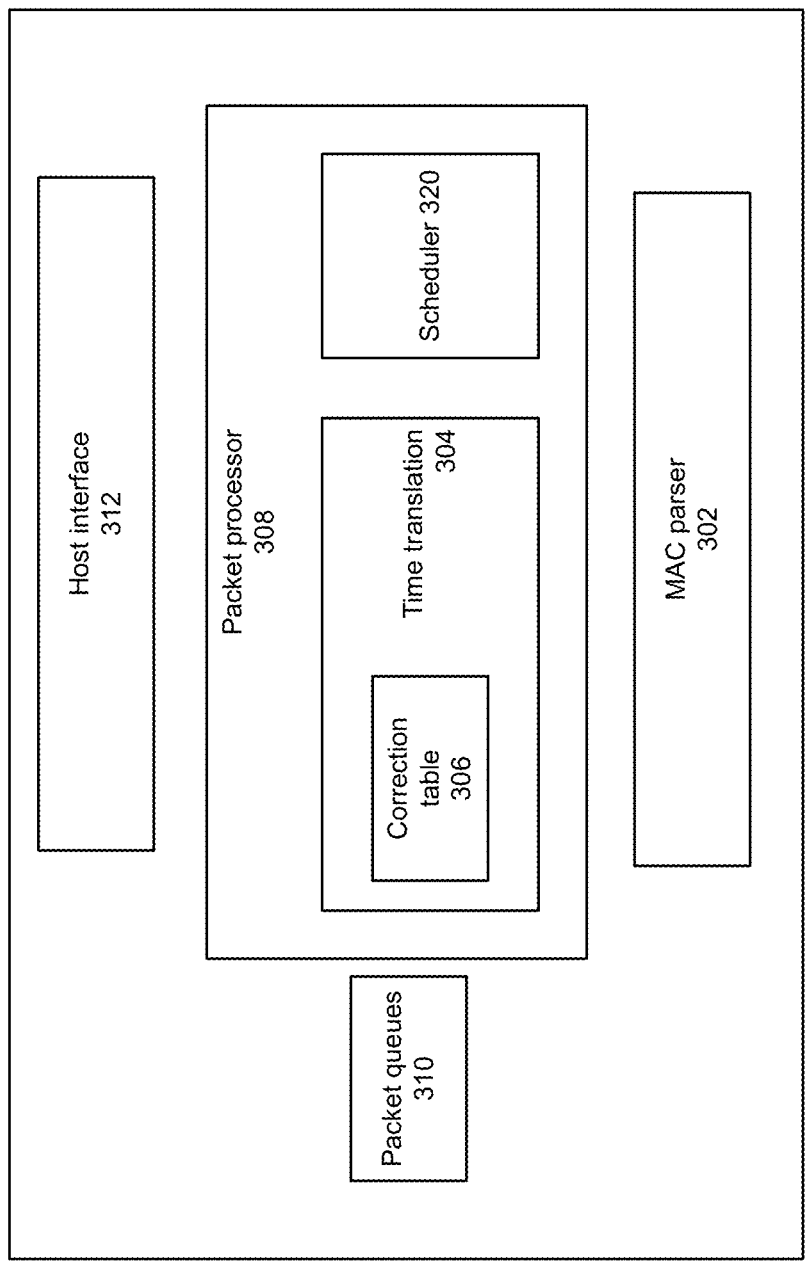
FIG. 3 depicts an example of a network interface device.

FIG. 3 depicts an example of a network interface device. In some examples, media access control (MAC) parser 302 can determine a timing domain of an incoming packet. MAC parser 302 could parse a packet header to determine a time domain of a packet, or associate the packet with a queue group or flow's time domain. For example, MAC destination address, source address or virtual LAN (VLAN) tag of the arriving packet can be used to determine a packet sender's time domain. MAC parser 302 could determine the time domain information and translation parameters by reading transaction metadata or parsing PCIe traffic. MAC parser 302 could determine the time domain information and translation parameters from deep packet inspection of the current packet or other or previous packets. The time domain could also be a non-Ethernet based such as proprietary wired, wireless, optical, etc. For example, packet header information used to determine a time domain can include one or more of: an Ethernet Port identifier (ID), Host Port ID, Traffic Class, Virtual Machine ID, Index, Security Association, Source Address, Destination Address, Multiprotocol Label Switching (MPLS) TAG, Queue ID, Queue Pair ID, etc.

Time translation 304 and/or MAC parser 302 can convert the packet arrival time stamp from a first time domain to a second time domain. The network interface device can access time domain information and parameters from correction table 306 to translate a time stamp from main timer domain to time domain of a host. In some examples, the network interface device can perform time stamp translation from main timer domain to time domain of a target host or target VM. The network interface device can access time domain information and parameters from correction table 306 and provide the parameters to a host or target VM for the host or target VM to adjust a time stamp.

Packet processor 308 can update telemetry counters based on time domain and translated time stamp of the packet. Features such as timing wheel and TSN/802.1Qbv schedulers could also use the time domain and translated time stamp of the packet. Likewise, the metadata time domain information can be used to update information in the packet as it departs the network interface device chip (e.g., IEEE 1588 1-step, Y.1731, INT, Two-Way Active Measurement Protocol (TWAMP), Data-Plane Time synchronization Protocol (DPTP), Huygens, etc.)

Packet scheduler 320 can use the translated time stamp to main timer domain (or network-based time) as a scheduling input to perform a global transaction based on network time for that packet or flows domain. For example, if a scheduling event is based on a reference time domain, the packet's time domain is converted to the scheduler's reference time domain. Scheduler 320 could fetch the data for transmission or transmit the data based on a translated time. A queue's credit updates could be replenished at a rate based on the queue's packets time domain translated into the scheduler's reference time domain.

Packet time domain information can be obtained via metadata, parsing, or via queue number. A traffic shaper could recognize a queue number X and use time domain X for time aware processing. In some examples, a network interface device can translate between different time domains based on the PCIe, host, and end point related information, such as the PCIe interface number, HostID, bus:device:function (BDF), etc. In some examples, a PCIe Endpoint or Root Port could use PTM to align to a different time domain and utilize mapping PTP domain number to queue number or metadata and having network interface device or host provide correction parameters.

Parser 302 can parse the packet, determine it is a multicast packet, and send the packet to multiple ports. If a multicast packet arrives, the multicast packet could be timestamped by the PHY using the Main Timer to indicate the arrival time. When the packet is replicated in a parser, the time domain information could be used to change the arrival time to match the time domain of the replicated packet.

Packet processor 308 can utilize translated time domains for operations such as, but not limited, to: telemetry collection; timing wheel; metering; policing; Inline Telemetry (INT); Precise Time Measurement (PTM); traffic shapers; schedulers; Time Sensitive Networking (TSN) features such as 802.1Qbv; security mechanisms; Operations, Administration, and Maintenance (OAM) features; quality of service (QoS) features; artificial intelligence features; machine learning features; rate limiters; timers; retry timers; service level agreement (SLA) features; virtual machine/hypervisor operations; pulse generation (such as pulse per second); timed Input/Output; clock generation, etc.

Figure 4:
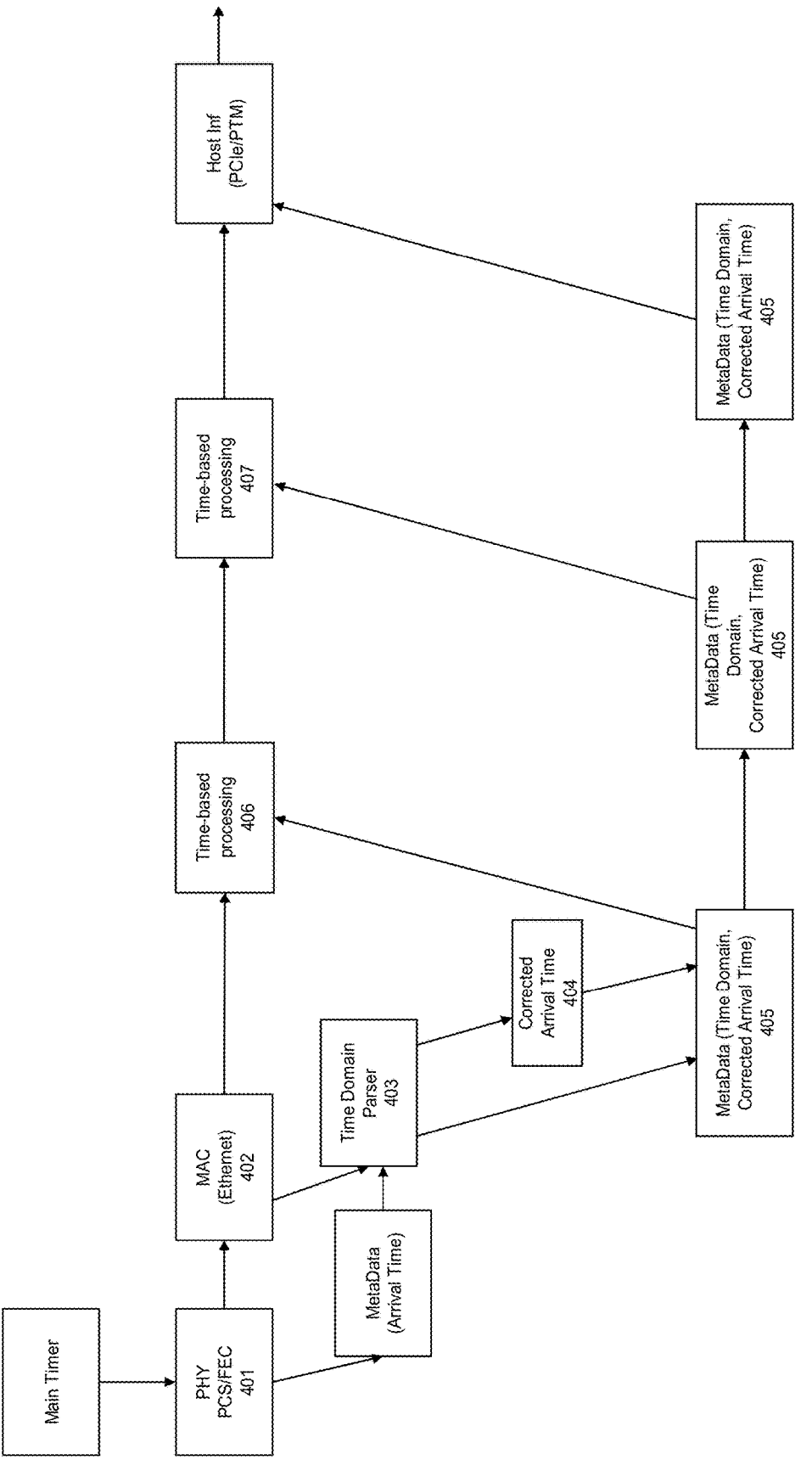
FIG. 4 shows an example of an ingress data path.

FIG. 4 shows an example of an ingress data path. At 401, for a received packet at a physical layer interface (PHY), its arrival time is timestamped using the main timer. The main timer can be a free running timer, or a timer associated with a Sync-E port. The packet arrival time can be stored in metadata for the received packet. At 402, the media access controller (MAC) can utilize a parser 403 to determine a time domain of the received packet. For example, a Virtual local area network virtual priority (e.g., VLAN VPRI), MPLS_EXT, Differentiated Services Code Point (DSCP), or other header fields can be used to determine the time domain of the packet. The time domain can be used to update the arrival time using translation technologies described herein to provide a corrected arrival time 404. The metadata can be updated to identify corrected arrival time 404 and the time domain identifier for the packet.

For example, a packet that arrives at 1 PM in the main domain. However, its value is corrected to a different time zone that is 1 hour ahead. Thus, the corrected arrival time is 2 PM, and that value is then used by time-based processing circuitry 406 and 407. Note that other examples could correct time stamps by millisecond(s), microsecond(s), nanosecond(s), picosecond(s), or smaller time increments.

As the packet passes through the ingress data processing path, circuitry process the packet and/or use the corrected arrival time as a reference. Time-based processing circuitry 406 and/or 407 can perform security processing on the packet and use corrected arrival time to select a decryption key. Time-based processing circuitry 406 and/or 407 can perform other examples of packet processing such as one or more of: telemetry collection, traffic shaping, packet transmit scheduling, time-aware input/outputs (IOs), PTM, Pulse Per Second (PPS) signals, etc.

In the case of an incoming multicast packet, the packet could be assigned to the main timer domain, and be processed as part of the main timer domain. When the packet is replicated, it could then be translated into the time domain of the individual replicated packet and provided to the relevant host or VM.

Figure 5:
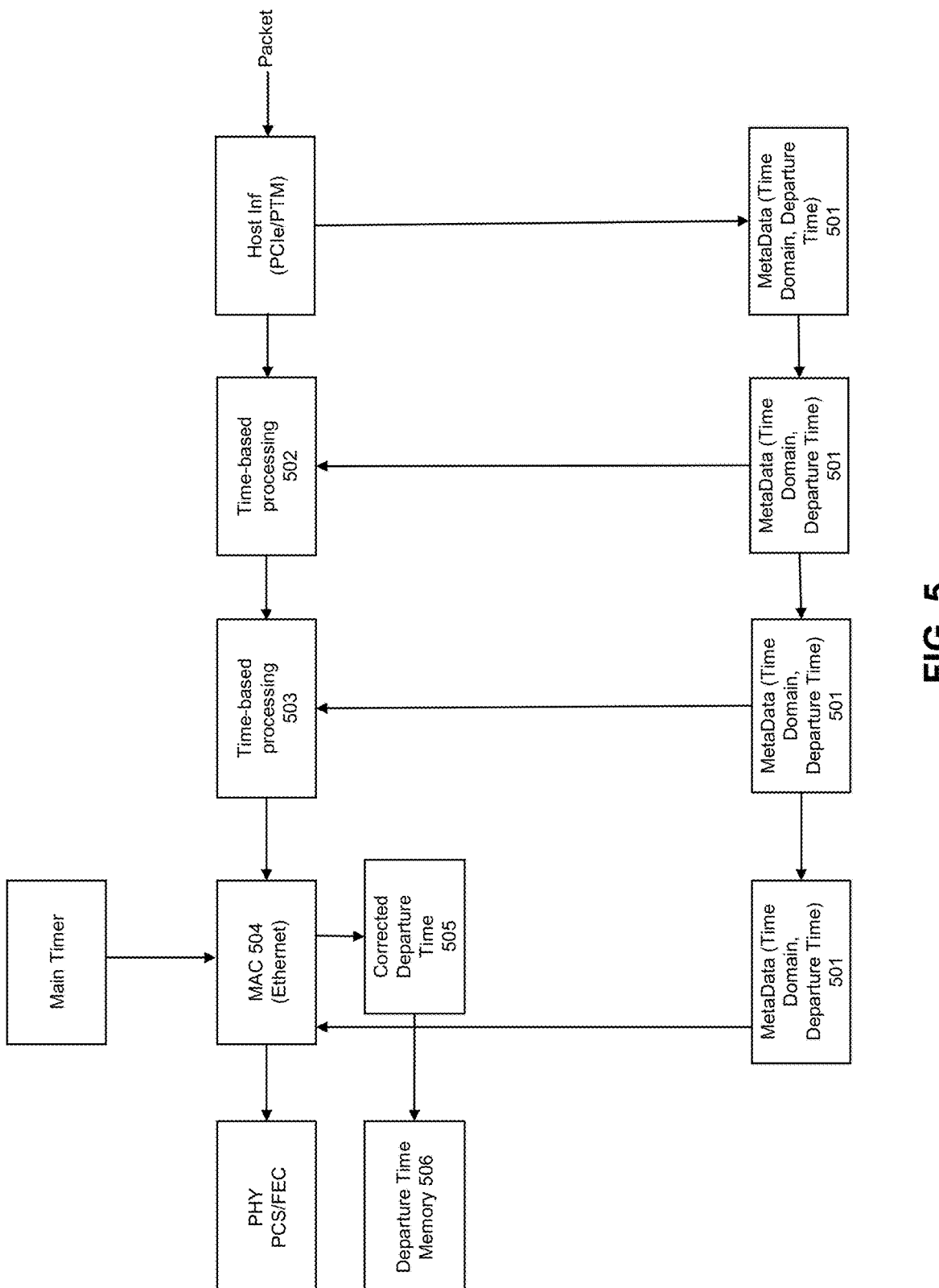
FIG. 5 shows an example of an egress data path.

FIG. 5 shows an example egress packet processing path. A host or VM executed by a host utilizes a particular time domain, and inserts the time domain information and packet sender's time domain identifier into packet metadata 501. Metadata 501 is available to time-based processing 502 and 503 of the packet as the packet passes through an egress path to transmission. In some examples, based on the sender host's or VM's time domain, time-based processing 502 and 503 can perform one or more of: an egress scheduler (e.g., IEEE 802.1 Qbv/TSN scheduler), traffic shaper, encryption, and so forth.

MAC 504 can perform translation from time domain of the sender host or VM to main timer's time domain. The packet's departure time can be converted or translated into the main timer's domain as corrected departure time 505, so that it can be transmitted at the correct time. Note that some implementations may store both the main timer domain's departure time and the packet domain's departure time into departure time memory 506.

In the case of egress packet multicast, an egress packet to be multi-casted could be based on the main timer domain, or it could be programmed to a different time domain, such as a domain of the receiver. In the case where the packet is replicated across ports from different time domains, it could start as a main time domain packet, and then the replicated packets could then be assigned the domain of the departure port or Ethernet endpoint's domain. In some examples, a port can have its own timing domain and time domain translation can occur to time domain of a departure port domain.

FIG. 6A depicts examples of processing of packets. For example, arrival time example 600 provides a translation of an arrival time stamp of a packet determined using a main timer to a domain of a receiver host or virtual machine. At 601, a packet arrives at a port of the network device. At 602, a time stamp of the packet arrival time is recorded based on the main timer domain. At 603, the packet is parsed to determine a target time domain. At 604, the packet arrival time is updated based on the packet's target time domain. At 605, the packet is copied to a target memory device with metadata of time domain and translated time stamp in target time domain and/or correction parameters. In some examples, the network interface device can perform translation of time stamp to the target time domain. In some examples, the target host or virtual machine can utilize the correction parameters to translate the packet arrival time stamp from main timer domain to target time domain.

Scheduler example 610 provides an example of translation of a transmission time stamp to main timer domain. At 611, a packet is available to be scheduled for transmission by a scheduler. At 612, the packet's time domain is retrieved from metadata. At 613, a departure time of the packet is retrieved from metadata. At 614, the departure time is translated into the main timer domain by the network interface device. At 615, the packet is scheduled for departure in the main time domain. At 616, the packet is transmitted using the packet departure time.

If there are different time domains used to collect telemetry data, the time or time stamp recorded by the different device could be out of synchronization and various examples could correct time stamps. Inline telemetry example 620 can utilize time stamp translation to update a packet's checksum or Cyclic Redundancy Check (CRC) value. At 621, packet arrives for inline telemetry processing. At 622, a packet's time domain can be retrieved from metadata. At 623, a current time can be retrieved based on a Main Timer. At 624, the network interface device translates current Main Timer-based time stamp into the packet's time domain (e.g., the packet sender's time domain). At 625, based on the translated time, the packet content is updated. For example, a packet's checksum or CRC value can be updated based on the translated time. At 626, the packet can be transmitted or copied to a next module or network interface device.

FIG. 6B depicts examples of processing of packets. Histogram example 630 can collect data of time counter changes between creation time and packet identification. At 631, packet is identified that is subject to telemetry histogram collection. At 632, the packet's time domain is retrieved from metadata. At 633, a packet "creation" time stamp can be retrieved from the metadata. At 634, a packet "creation" time stamp can be converted from the packet sender's time domain to Main Timer domain. At 635, the packet "creation" time stamp in Main Timer domain can be subtracted from the current Main Timer time stamp to determine the latency of the packet in the main timer domain and the latency can be used to increment the associated histogram latency bucket. At 636, a histogram can be updated based on difference between packet creation time stamp and packet current time in the Main Timer domain.

A packet departure time can be based on the main timer of the network interface device. The packet departure time in a different domain can cause early or late packet departure. By converting the departure time into the main timer domain, the network interface device can use the main time domain for packets, regardless of their original domain. Departure time example 640 provides an example of time stamp conversion to a packet sender's time domain. At 641, a packet is identified as ready for departure from a port of a network interface device. At 642, the packet's time domain can be retrieved from metadata. At 643, the packet departure time recorded in Main Timer domain can be retrieved from the metadata. At 644, a network interface device can convert the packet departure time in Main Timer domain can be converted to the packet's time domain. At 645, the packet departure time in the packet's time domain can be stored in the metadata.

FIG. 7 depicts example security-related processing of packets. Example 700 includes a decryption operation with keys accessed based on a Main Timer domain. At 701, a packet arrives for crypto processing. At 702, the packet's arrival time in packet's domain is converted to Main Timer domain. At 703, keys are selected based on arrival time of the packet in the Main Timer domain. At 704, the packet can be decrypted with key based on Main Timer domain.

Example 710 includes a decryption operation with keys accessed based on a packet domain timer. At 711, a packet arrives for crypto processing. At 712, keys are selected based on arrival time of the packet in the sender's time domain. At 713, the packet can be decrypted with a key based on packet sender's time domain.

Figure 8:
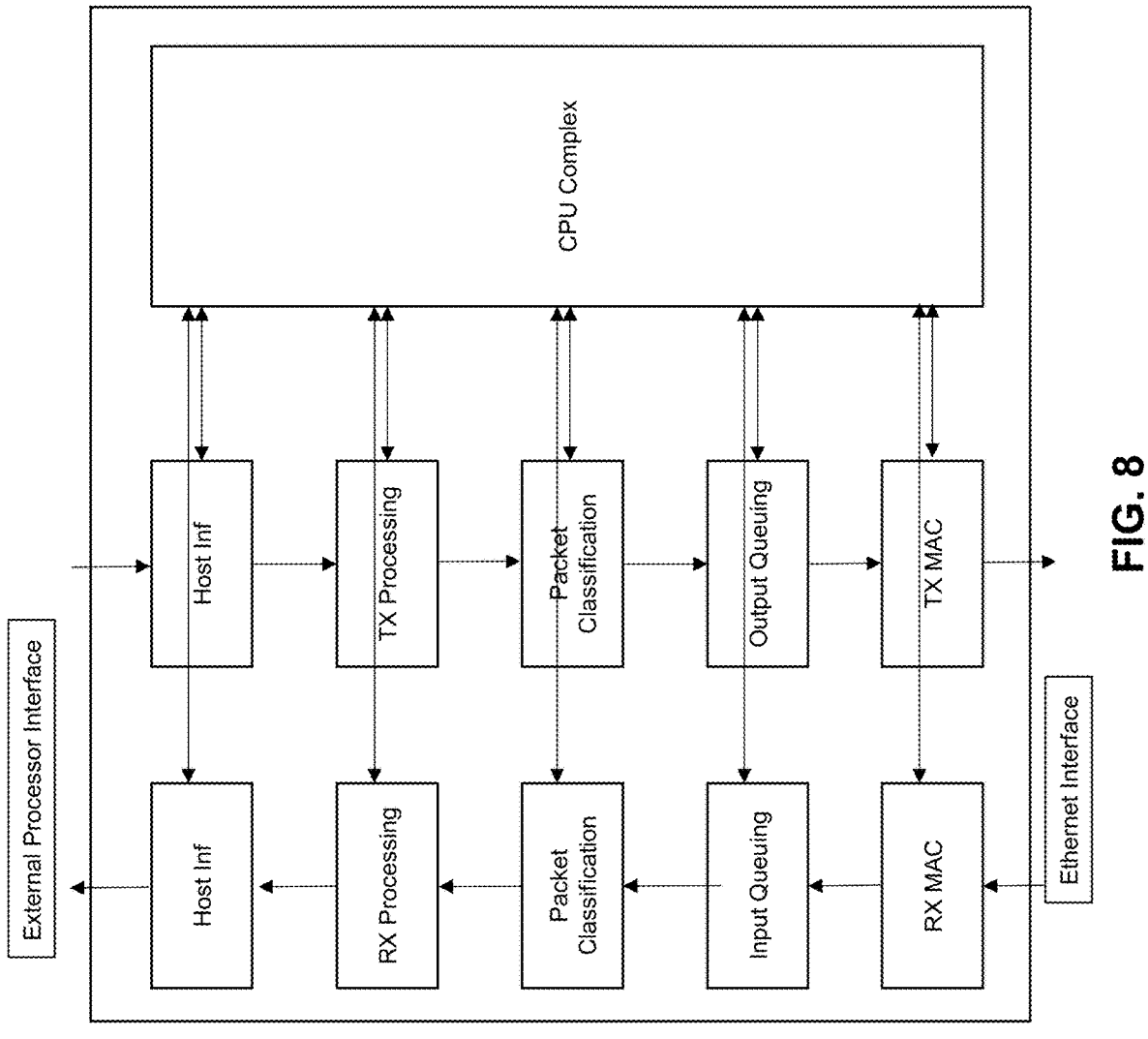
FIG. 8 depicts an example of a network interface device with ingress and egress pipelines.

FIG. 8 depicts an example of an IPU. Receive processing, packet classification, input queueing, transmit processing, and/or output queueing can utilize time stamp translation to a main timer domain or from the main timer domain to a target domain. The time domain translation could be performed by CPUs within an IPU or CPUs coupled to the IPU. In some examples, time domain translation could be performed in an application specific integrated circuit (ASIC) within the IPU or coupled to the IPU. In examples, the CPU and/or ASIC can be within a same system on chip (SoC) as that of the IPU. In examples, the CPU and/or ASIC can be outside of a SoC of the IPU and coupled to the SoC.

Figure 9:
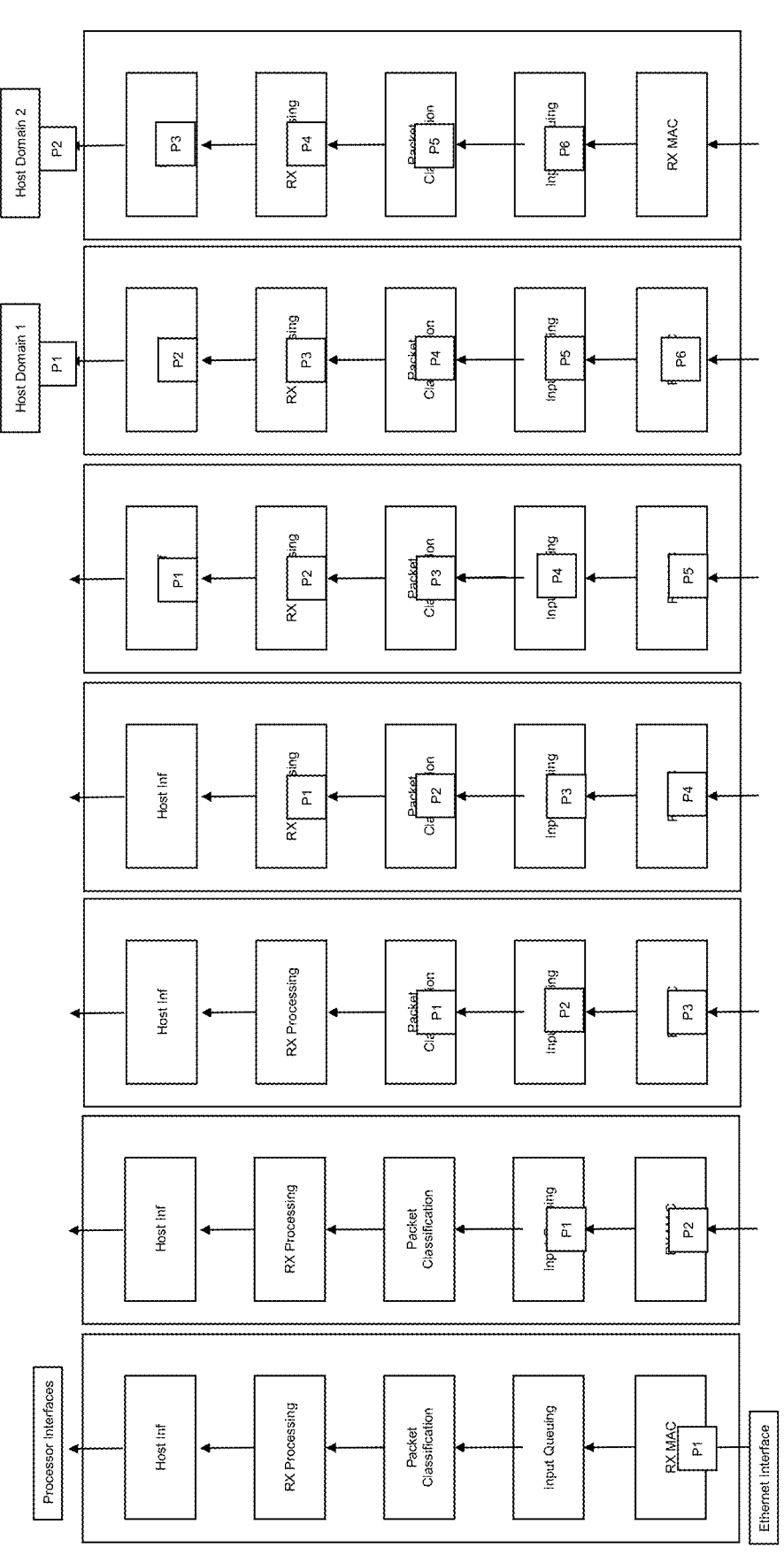
FIG. 9 depicts an example of packet pipeline traversal.

FIG. 9 depicts an example of how packets of different time domains can traverse the pipeline to the host. The pipeline can include receiver MAC, input queue, packet classification, receiver processing, and a host interface to a host. In this example, packets P1-P6 are associated with different time domains. In this example packet P1 is provided to a host having host domain 1 and packet P2 is provided to a host having host domain 2. Please note a single packet per ingress datapath unit is shown for simplicity. Each ingress and egress module could be processing multiple packets from multiple domains depending on storage and pipelining. Also, for simplicity the ingress is shown, but the same could be done for the egress. While only 5 stages are shown, there could be many more stages (e.g., cryptography, remote direct memory access (RDMA), large send offload (LSO), scheduling, Metering, QoS, Parsing, processing, replication, recirculation, buffering, etc.). CPUs in a CPU complex could be considered hosts.

Figure 10:
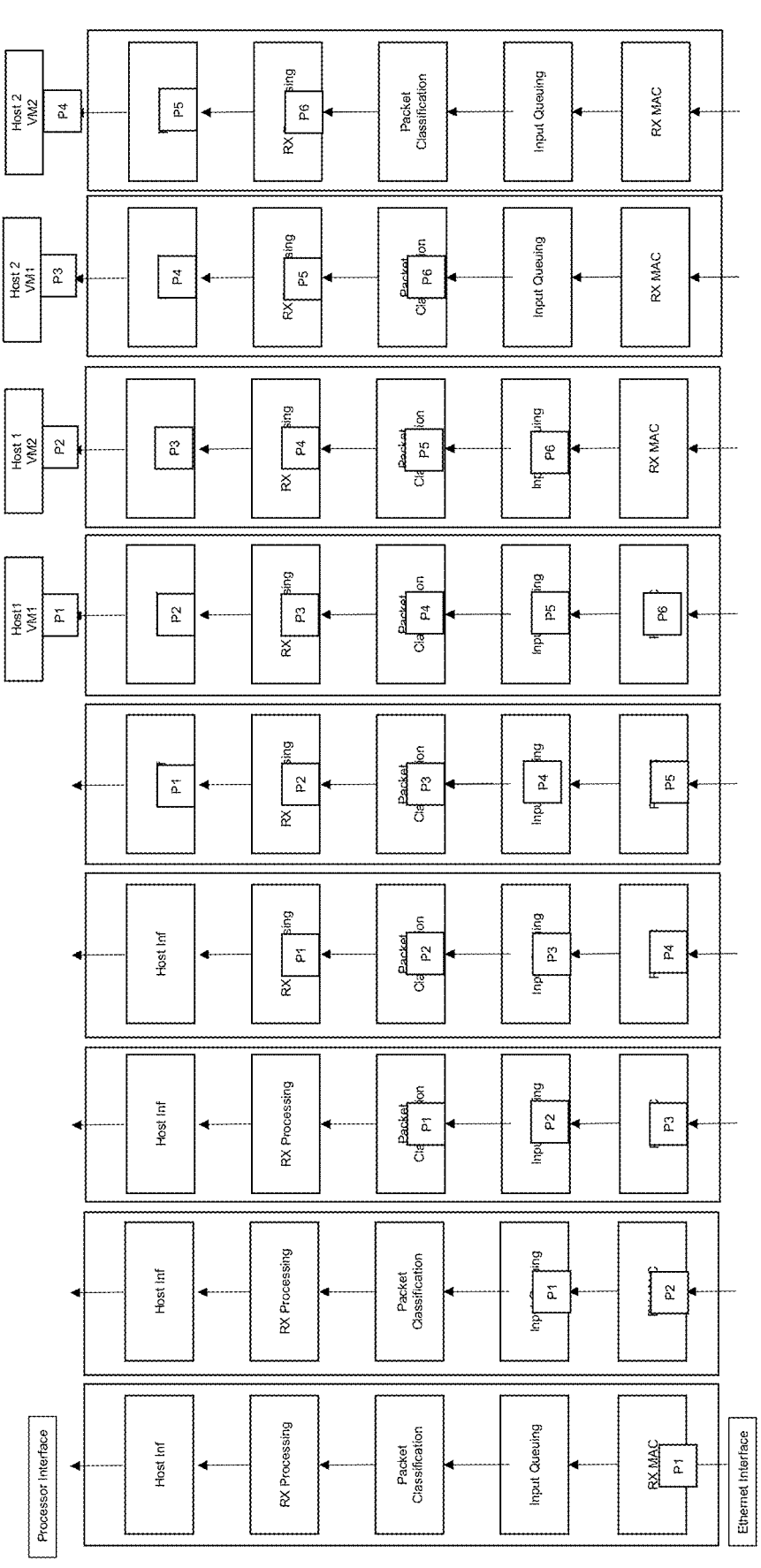
FIG. 10 depicts an example of packet pipeline traversal.

FIG. 10 depicts an example of how the same packets could be provided to virtual machines on the same or different hosts. In this example, packets P1-P6 are associated with different time domains. In this example packet P1 is provided to a VM associated with host domain 1, packet P2 is provided to a VM associated with host domain 2, packet P3 is provided to a VM associated with host domain 3, and packet P4 is provided to a VM associated with host domain 4.

In some examples, N PCIe connections with N different domains can be supported, where N is an integer that is 1 or more. A precision time measurement (PTM) controller can utilize time in its own domain and the network interface device can control that time domain. Hardware acceleration functions in a network interface device can take advantage of the different domains to perform operations on a per packet basis on the packet's time domain. Operations can include Traffic Shapers, Timing Wheel, in-network telemetry (INT), histograms, etc. Telemetry data within a packet could be updated to translate from packet sender or source time domain to packet receiver or destination time domain. For example, INT packet timestamps could be adjusted to be in the packet receiver's time domain. Where packet timing and latency measurements are based on a packet sender's time domain, a histogram can be updated based on the same host and port information without timing skew from multiple domains.

Network performance monitoring (e.g., Y.1731/TWAMP) updates could be based on the individual destination's time domain. Such network performance monitoring can be used in co-location equipment to verify Service Level Agreements (SLAs).

In some examples, 802.1Qbv scheduling can be performed based of translation of the departure time into a common scheduling time. Some examples can support multiple Pulse Per Second (PPS) based on a reference counter and time domain. Some examples can support timing of multiple input output (TO) signals based on a reference counter and time domain.

Class of Service or quality of service can dictate which time domain is used, based off a reference time domain.

The network device could translate timing information from one xPU, VM, or microservice to the domain of another xPU, VM, or microservice. For example, one virtual machine can communicate with another virtual machine executing on either the same or different server, both connected to the same network interface device. Individual microservices may have their own time domain. The network interface device may group microservices based on their time domain on servers or xPUs that support that time domain. The IPU may transfer the time domain parameters for that microservice with the packets or data to perform time stamp translation to such time domain instead of use of the main timer time domain.

A service provider could allocate part of its infrastructure to one or more data center or cloud providers. A cloud provider may have its own definition of precise and accurate time that is different than that of the service provider. Hence the network interface device can perform time stamp translation for different companies being serviced by the service provider.

A third party could offer Time-As-A-Service (TaaS) to multiple customers based on the customer's understanding of precise and accurate time or the association between the TAAS provider's understanding of time and the customers understanding of time.

Some accelerators have a concept of a time-out. Like schedulers, a time-out could be based on its own time domain. Hence, a time-out block might use one global time domain to determine time-outs and involve converting time-outs from a first domain to a the global domain used for time-out.

Figure 11:
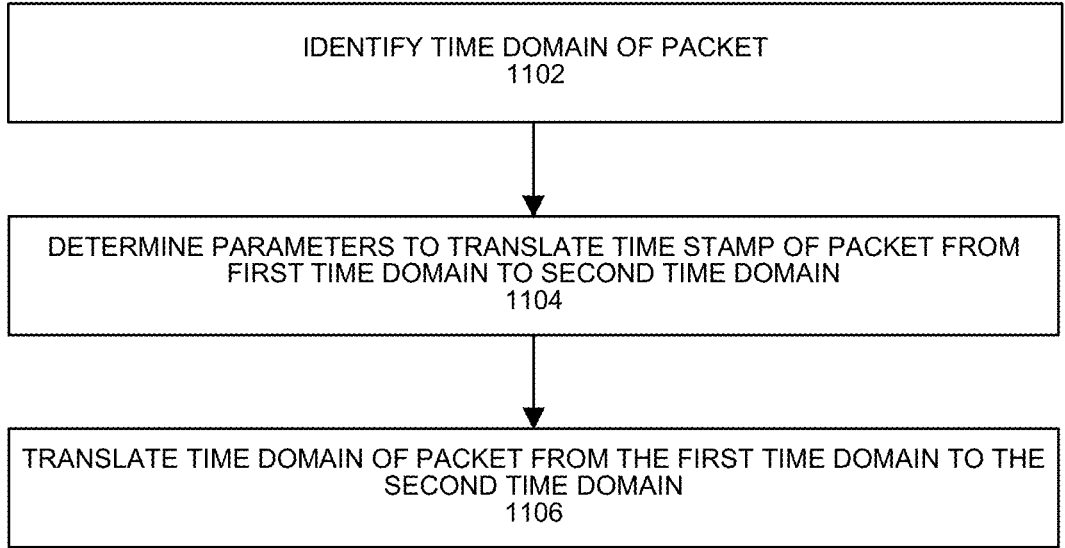
FIG. 11 depicts an example process.

FIG. 11 depicts an example process. The process can be performed by a network interface device, host server, and/or VM. At 1102, a time domain of a packet is determined. At 1104, parameters to translate a time stamp associated with the packet from a first time domain to a second time domain can be determined. The first time domain can be of a packet source and the second time domain can be the main timer domain. The first time domain can be the main timer domain and the second time domain can be a time domain of a packet destination. Numerous other examples of translation from one time domain to another time domain are described herein. At 1106, the network interface device, a host server, and/or VM can perform translation of time stamp from the first time domain to the second time domain and provide the translated time stamp. The translated time stamp can be used in a variety of manner as described herein.

Figure 12:
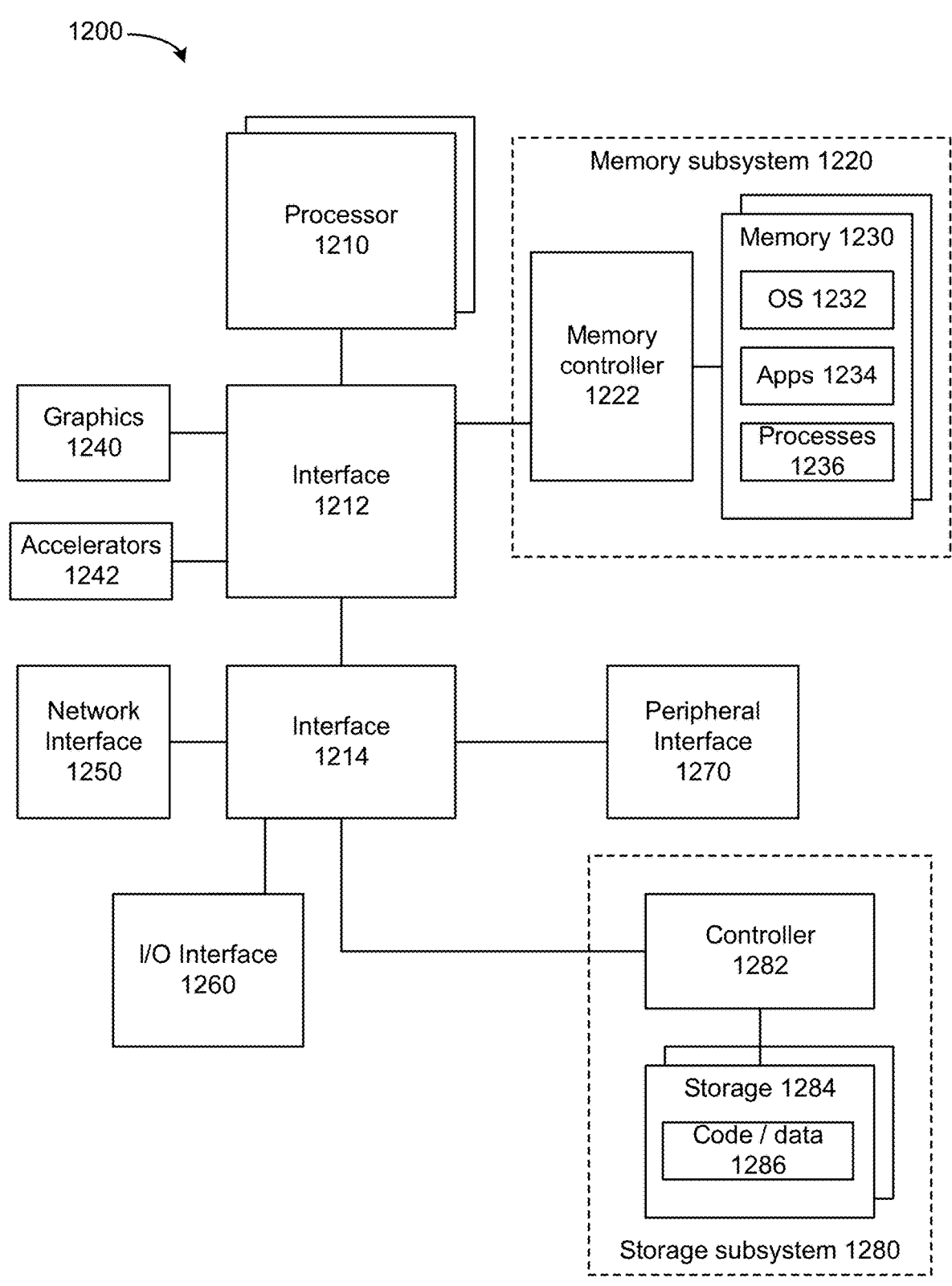
FIG. 12 depicts an example system.

FIG. 12 depicts an example computing system. System 1200 can be used to program network interface device 1250 or other circuitry (e.g., processors 1210 or a process executed thereon) to translate a time stamp to another time domain or provide parameters used to translate a time stamp to another domain, as described herein. Processor 1210 can include any type of microprocessor, central processing unit (CPU), graphics processing unit (GPU), processing core, or other processing hardware to provide processing for system 1200, or a combination of processors. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1200 includes interface 1212 coupled to processor 1210, which can represent a higher speed interface or a high throughput interface for system components that needs higher bandwidth connections, such as memory subsystem 1220 or graphics interface components 1240, or accelerators 1242. Interface 1212 represents an interface circuit, which can be a standalone component or integrated onto a processor die. Where present, graphics interface 1240 interfaces to graphics components for providing a visual display to a user of system 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

Accelerators 1242 can be a fixed function or programmable offload engine that can be accessed or used by a processor 1210. For example, an accelerator among accelerators 1242 can provide compression (DC) capability, cryptography services such as public key encryption (PKE), cipher, hash/authentication capabilities, decryption, or other capabilities or services. In some embodiments, in addition or alternatively, an accelerator among accelerators 1242 provides field select controller capabilities as described herein. In some cases, accelerators 1242 can be integrated into a CPU socket (e.g., a connector to a motherboard or circuit board that includes a CPU and provides an electrical interface with the CPU). For example, accelerators 1242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1242 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1220 represents the main memory of system 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

In some examples, OS 1232 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure and/or offload to network interface 1250 to perform time stamp translation and/or provide time stamp translation parameters to a host system and/or VM, as described herein.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a device that is in the same data center or rack or a remote device, which can include sending data stored in memory.

Some examples of network interface 1250 are part of an Infrastructure Processing Unit (IPU) or data processing unit (DPU) or utilized by an IPU or DPU. An xPU can refer at least to an IPU, DPU, GPU, general purpose GPU (GPGPU), or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (e.g., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (e.g., the value or state of the data is indeterminate if power is interrupted to system 1200). In one example, storage subsystem 1280 includes controller 1282 to interface with storage 1284. In one example controller 1282 is a physical part of interface 1214 or processor 1210 or can include circuits or logic in both processor 1210 and interface 1214.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1200. More specifically, power source typically interfaces to one or multiple power supplies in system 1200 to provide power to the components of system 1200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1200 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising circuitry to determine a target time domain in which to translate a time stamp associated with a workload and identify the target time domain to cause translation of the time stamp associated with the workload to the target time domain.

Example 2 includes one or more examples, wherein the network interface device comprises circuitry to store time domain translation parameters of time stamps from a first time domain to one or more time domains, the network interface device comprises circuitry to translate the time stamp from the first time domain to the one or more time domains, and the workload is performed based on the translated time stamp in at least one of the one or more time domains.

Example 3 includes one or more examples, wherein the network interface device comprises circuitry to store time domain translation parameters of time stamps from a first time domain to one or more time domains, the network interface device comprises circuitry to provide the time domain translation parameters to a server, the server is to perform translation of the time stamp from the first time domain to the one or more time domains based on the time domain translation parameters.

Example 4 includes one or more examples, wherein the network interface device comprises circuitry to store time domain translation parameters of time stamps from a first time domain to one or more time domains, the network interface device comprises circuitry to provide the time domain translation parameters to a server, and a virtual machine executed by the server is to perform translation of the time stamp from the first time domain to the one or more time domains based on the time domain translation parameters.

Example 5 includes one or more examples, wherein the workload comprises two or more of: packet transmission scheduling, telemetry collection, cryptography operation, packet arrival time update, histogram collection, or packet departure time update.

Example 6 includes one or more examples, wherein the network interface device comprises one or more of: an infrastructure processing unit (IPU), data processing unit (DPU), smartNIC, forwarding element, switch, router, network interface controller, or network-attached appliance.

Example 7 includes one or more examples, comprising a server communicatively coupled to the network interface device, wherein the server is to execute a virtual machine to perform the workload based on the translated time stamp.

Example 8 includes one or more examples, comprising a data center, wherein the data center comprises the server and the time stamp is based on a clock signal utilized by a second server that sent a packet with data to be processed as part of the workload.

Example 9 includes one or more examples, and includes a method comprising: in a network interface device, performing at least a part of a translation of a time stamp from a first time domain to one or more other time domains, wherein a workload is performed based on a translated time stamp in at least one of the one or more other time domains.

Example 10 includes one or more examples, and includes: in the network interface device, storing time domain translation parameters of time stamps from the first time domain to the one or more other time domains.

Example 11 includes one or more examples, wherein performing at least a part of a translation of a time stamp from a first time domain to one or more other time domains comprises the network interface device performing translation of the time stamp from the first time domain to one or more other time domains based on the time domain translation parameters.

Example 12 includes one or more examples, wherein performing at least a part of a translation of a time stamp from a first time domain to one or more other time domains comprises the network interface device providing time domain translation parameters to a server and comprising: the server performing translation of the time stamp from the first time domain to one or more other time domains based on the time domain translation parameters.

Example 13 includes one or more examples, wherein performing at least a part of a translation of a time stamp from a first time domain to one or more other time domains comprises the network interface device providing time domain translation parameters to a server and comprising a virtual machine performing translation of the time stamp from the first time domain to one or more other time domains based on the time domain translation parameters.

Example 14 includes one or more examples, wherein the workload comprises one or more of: packet transmission scheduling, telemetry collection, cryptography operation, packet arrival time update, histogram collection, or packet departure time update.

Example 15 includes one or more examples, wherein the network interface device comprises one or more of: an infrastructure processing unit (IPU), data processing unit (DPU), smartNIC, forwarding element, switch, router, network interface controller, or network-attached appliance.

Example 16 includes one or more examples, and includes a computer-readable medium comprising instructions stored thereon, that if executed by one or more processors, cause the one or more processors to: configure a network interface device to perform a translation of a time stamp from a first time domain to one or more other time domains and/or provide time domain translation parameters to a server to perform the translation of the time stamp from the first time domain to one or more other time domains, wherein a workload is performed by the server based on the translated time stamp in at least one of the one or more other time domains.

Example 17 includes one or more examples, wherein the first time domain comprises a timer domain of the network interface device or a network-based timer.

Example 18 includes one or more examples, wherein the one or more other time domains comprise one or more time domains of the server and/or a virtual machine.

Example 19 includes one or more examples, wherein the translation of a time stamp is based on the time domain translation parameters.

Example 20 includes one or more examples, wherein, at the server, the translation of the time stamp from the first time domain to one or more other time domains is performed by one or more of: a virtual machine, container, microservice, serverless application, or application.

What is claimed is:

1. An apparatus comprising:
   a network interface device comprising:
   a network interface;
   a direct memory access (DMA) circuitry;
   a host interface; and circuitry to translate a time stamp associated with a packet received by the network interface from a first time domain to a second time domain, wherein:

the second time domain is associated with a host system coupled to the host interface or a second process executed by the host system, a third time domain is associated with a second process, based on receipt of a second packet from a device in the first time domain to be processed by the second process, the circuitry is to perform a translation of a time stamp of the second packet from the first time domain to the third time domain based on time domain translation parameters, a fourth time domain is associated with a third process, based on receipt of a third packet in a fifth time domain to be processed by the third process, the circuitry is to perform translation of a time stamp of the third packet from the fifth time domain to the fourth time domain.

2. The apparatus of claim 1, wherein the network interface device comprises second circuitry to store time domain translation parameters of time stamps from the first time domain to the second time domain, and the host system is to process content of the received packet based on the translated time stamp in the second time domain.

3. The apparatus of claim 1, wherein the second host system or the second process is to process content of the received packet by performance of two or more of: packet transmission scheduling, telemetry collection, cryptography operation, packet arrival time update, histogram collection, or packet departure time update.

4. The apparatus of claim 1, wherein the network interface device comprises one or more of: an infrastructure processing unit (IPU), data processing unit (DPU), smartNIC, forwarding element, switch, router, network interface controller, or network-attached appliance.

5. The apparatus of claim 1, comprising the host system, wherein the host system is to execute the second process to process content of the received packet based on the translated time stamp by performance of two or more of: packet transmission scheduling, telemetry collection, cryptography operation, packet arrival time update, histogram collection, or packet departure time update.

6. The apparatus of claim 5, comprising a data center, wherein the data center comprises the host system and the time stamp is based on a clock signal utilized by the host system that sent the packet to the network interface device.

7. The apparatus of claim 1, wherein the circuitry is to perform translation of the time stamp associated with the received packet from the first time domain to the second time domain based on time parameters and wherein the time parameters comprise variables to apply to correlate time stamps in the first time domain to the second time domain.

8. The apparatus of claim 1, wherein the host system is to offload performance of time stamp translation to the circuitry of the network interface device.

9. A method comprising:

in a network interface device, performing a translation of a time stamp of a received packet from a device in a first time domain to a second time domain, wherein:

the network interface device comprises a network interface, a direct memory access (DMA) circuitry, and a host interface and the second time domain is associated with a server coupled to the host interface or associated with a process executed by the server;

at the server, processing content of the received packet based on the translated time stamp in the second time domain, a third time domain is associated with a second process executed by the server, based on receipt of a second packet from the device in the first time domain to be processed by the second process, the network interface device performing a translation of a time stamp of the second packet from the first time domain to the third time domain based on time domain translation parameters, a fourth time domain is associated with a third process executed by the server, and based on receipt of a third packet from a device in a fifth time domain to be processed by the third process, the network interface device performing a translation of a time stamp of the third packet from the fifth time domain to the fourth time domain.

10. The method of claim 9, comprising:

in the network interface device, storing time domain translation parameters of time stamps from the first time domain to the second time domain.

11. The method of claim 10, wherein performing translation of the time stamp from the first time domain to the second time domain comprises the network interface device performing translation of the time stamp from the first time domain to the second time domain based on the time domain translation parameters and wherein the time domain translation parameters comprise variables to apply to correlate time stamps in the first time domain to the second time domain.

12. The method of claim 10, wherein performing translation of the time stamp from the first time domain to the second time domain comprises the network interface device providing time domain translation parameters to the server and comprising:

the server performing translation of the time stamp from the first time domain to the second time domain based on the time domain translation parameters.

13. The method of claim 10, wherein performing translation of a time stamp from the first time domain to the second time domain comprises the network interface device providing the time domain translation parameters to the server and comprising a process, executed by the server, performing translation of the time stamp from the first time domain to the second time domain based on the time domain translation parameters.

14. The method of claim 9, wherein the processing content of the received packet comprises one or more of: packet transmission scheduling, telemetry collection, cryptography operation, packet arrival time update, histogram collection, or packet departure time update.

15. The method of claim 9, wherein the network interface device comprises one or more of: an infrastructure processing unit (IPU), data processing unit (DPU), smartNIC, forwarding element, switch, router, network interface controller, or network-attached appliance.

16. At least one non-transitory computer-readable medium comprising instructions stored thereon, that if executed by one or more processors, cause the one or more processors to:

configure a network interface device to perform a translation of a time stamp of a packet from a first time domain to a second time domain and/or provide time domain translation parameters to a server to perform the translation of the time stamp from the first time domain to the second time domain, wherein:

the network interface device comprises a network interface, a direct memory access (DMA) circuitry, and a host interface and the second time domain is associated with a server coupled to the host interface and/or associated with a process executed by the server;

the server is to process the packet based on the translated time stamp in at least the second time domain, a third time domain is associated with a second process executed by the server, based on receipt of a second packet from a device in the first time domain to be processed by the second process, the network interface device is to perform translation of a time stamp of the second packet from the first time domain to the third time domain based on time domain translation parameters, a fourth time domain is associated with a third process executed by the server, and based on receipt of a third packet from a device in a fifth time domain to be processed by the third process, the network interface device performing translation of a time stamp of the third packet from the fifth time domain to the fourth time domain.

17. The computer-readable medium of claim 16, wherein the first time domain comprises a timer domain of the network interface device.

18. The computer-readable medium of claim 16, wherein the translation of the time stamp is based on the time domain translation parameters.

19. The computer-readable medium of claim 16, wherein, at the server, the translation of the time stamp from the first time domain to one or more other time domains is performed by one or more of: a virtual machine, container, microservice, serverless application, or application.

20. The computer-readable medium of claim 16, wherein the server is to offload performance of time stamp translation to the network interface device.

* * * * *